(12) United States Patent
Chang

(10) Patent No.: US 11,078,826 B1
(45) Date of Patent: Aug. 3, 2021

(54) GASEOUS FUEL ENGINE AND SPARKLESS OPERATING STRATEGY THEREFOR

(71) Applicant: Caterpillar Inc., Peoria, IL (US)

(72) Inventor: David Yu-Zhang Chang, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/082,401

(22) Filed: Oct. 28, 2020

(51) Int. Cl.
*F02B 19/00* (2006.01)
*F02B 19/12* (2006.01)
*F02D 41/00* (2006.01)
*F02B 19/10* (2006.01)
*F02P 13/00* (2006.01)

(52) U.S. Cl.
CPC .......... *F02B 19/12* (2013.01); *F02D 41/0027* (2013.01); *F02B 19/108* (2013.01); *F02P 13/00* (2013.01)

(58) Field of Classification Search
CPC ...................................... Y02T 10/12
USPC ................................. 123/253, 275
See application file for complete search history.

(56) References Cited

U.S. PATENT DOCUMENTS

| | | | | |
|---|---|---|---|---|
| 2,970,581 A * | 2/1961 | Georges | ................ | F02D 15/04 123/48 A |
| 3,060,912 A * | 10/1962 | May | ................ | F02M 67/02 123/429 |
| 3,970,056 A * | 7/1976 | Morris | ................ | F02D 15/04 123/48 D |
| 4,246,873 A * | 1/1981 | Lih-Liaw | ................ | F02B 21/00 123/48 A |
| 4,271,810 A * | 6/1981 | Lancaster | ................ | F02D 13/0276 123/275 |
| 4,306,526 A * | 12/1981 | Schaub | ................ | F02B 43/00 123/257 |
| 4,332,223 A * | 6/1982 | Dalton | ................ | F02B 19/108 123/253 |
| 5,179,839 A * | 1/1993 | Bland | ................ | F02B 41/00 60/712 |
| 5,454,356 A * | 10/1995 | Kawamura | ................ | F01L 3/20 123/254 |
| 5,482,445 A * | 1/1996 | Achten | ................ | F02B 71/02 123/46 H |
| 5,924,402 A * | 7/1999 | Regueiro | ................ | F02B 19/14 123/254 |
| 5,950,593 A * | 9/1999 | Matsuoka | ................ | F02B 19/02 123/292 |
| 6,302,067 B1 * | 10/2001 | Merritt | ................ | F02B 19/06 123/48 D |
| 6,953,020 B2 * | 10/2005 | Kojic | ................ | F02B 77/085 123/256 |

(Continued)

FOREIGN PATENT DOCUMENTS

CN 107813691 A 3/2018

*Primary Examiner* — Phutthiwat Wongwian
*Assistant Examiner* — Sherman D Manley
(74) *Attorney, Agent, or Firm* — Brannon Sowers & Cracraft

(57) ABSTRACT

Operating an internal combustion engine system includes advancing a prechamber piston in a fuel delivery igniter to push a main charge of fuel from a prechamber into a cylinder, and advancing the prechamber piston to compression-ignite a pilot charge within the prechamber. Combustion gases of the pilot charge are conveyed into the cylinder to ignite the main charge. Operation of the engine system provides sparkless gaseous fuel ignition.

20 Claims, 2 Drawing Sheets

(56) References Cited

U.S. PATENT DOCUMENTS

| | | | |
|---|---|---|---|
| 7,100,567 B1* | 9/2006 | Bailey | F02B 19/12 123/268 |
| 7,107,964 B2* | 9/2006 | Kojic | F02B 77/085 123/254 |
| 10,161,296 B2* | 12/2018 | Schock | F02B 19/1023 |
| 10,202,959 B2* | 2/2019 | Kim | F02D 35/028 |
| 2003/0075121 A1* | 4/2003 | Dixon | F02B 1/12 123/48 A |
| 2003/0116121 A1* | 6/2003 | Agama | F02B 1/12 123/259 |
| 2003/0213461 A1* | 11/2003 | Regueiro | F02B 19/08 123/262 |
| 2004/0144357 A1* | 7/2004 | Adams | B25C 1/08 123/260 |
| 2006/0219210 A1* | 10/2006 | Bailey | F02B 19/12 123/259 |
| 2010/0263379 A1* | 10/2010 | Berkyto | F02B 43/10 60/651 |
| 2014/0158083 A1* | 6/2014 | Lee | F02B 19/12 123/275 |
| 2014/0331960 A1* | 11/2014 | Lee | F02B 19/06 123/275 |
| 2015/0369192 A1* | 12/2015 | Ge | F02M 45/086 123/445 |
| 2016/0069250 A1* | 3/2016 | Loetz | F02B 19/108 123/292 |
| 2016/0069251 A1* | 3/2016 | Loetz | F02B 19/06 123/286 |
| 2016/0333770 A1* | 11/2016 | Kreuter | F02B 19/108 |
| 2020/0116074 A1* | 4/2020 | Chang | F02B 19/108 |
| 2020/0392892 A1* | 12/2020 | Fiveland | F02B 19/14 |
| 2021/0079835 A1* | 3/2021 | Chiera | F02B 19/12 |

\* cited by examiner

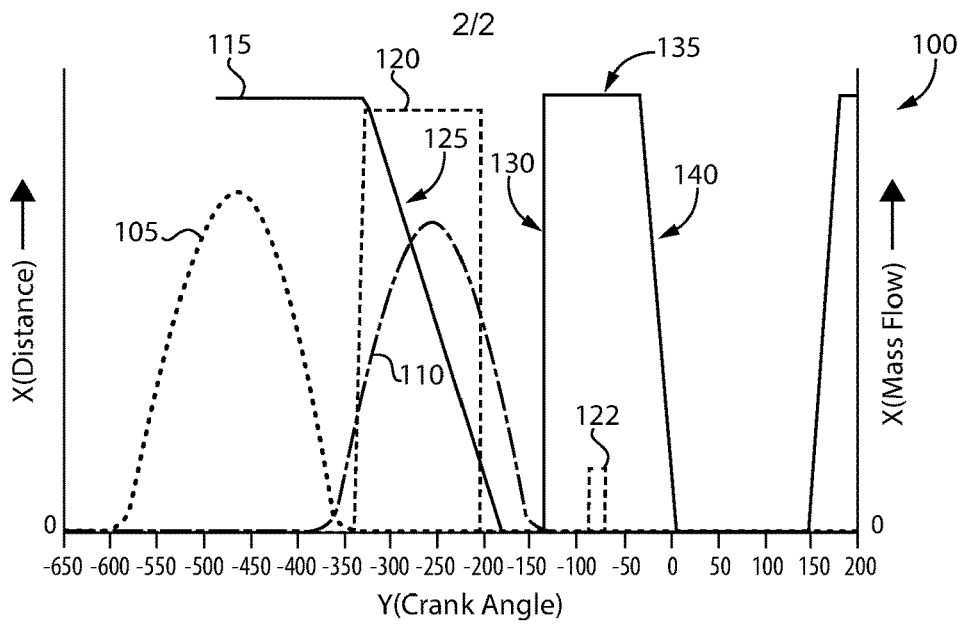
FIG. 2  ----- lift_in  ······· lift_exh  ——— Actuation Piston  ------- Fuel Mass Flow
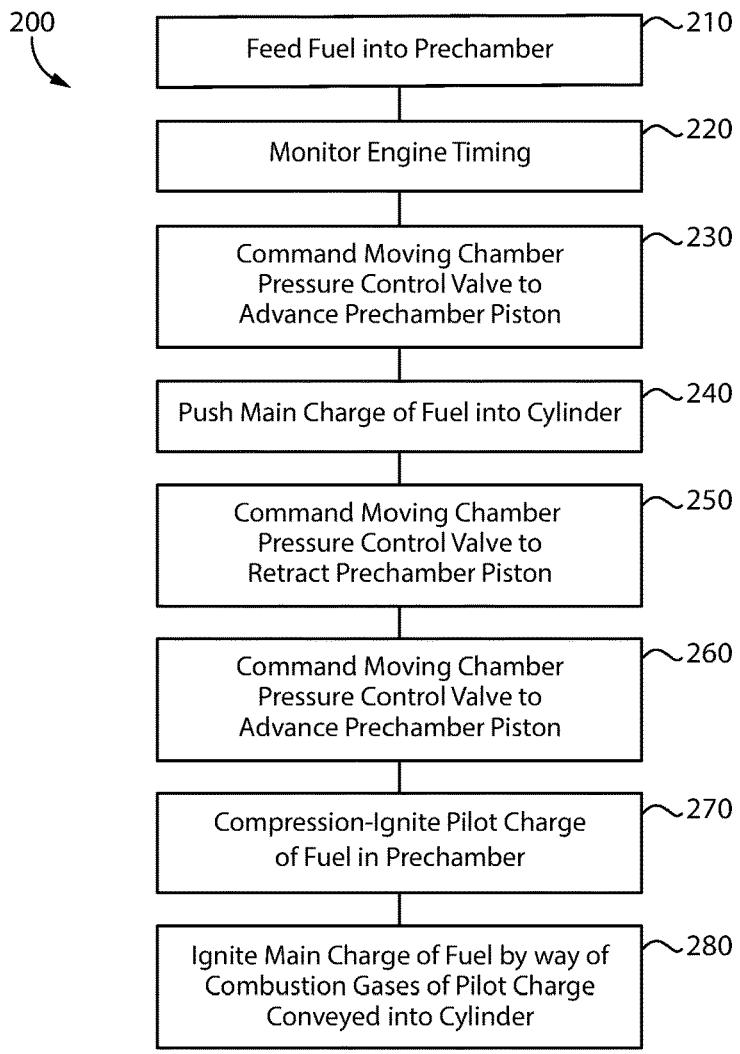
FIG. 3

GASEOUS FUEL ENGINE AND SPARKLESS OPERATING STRATEGY THEREFOR

TECHNICAL FIELD

The present disclosure relates generally to a fueling and ignition strategy for an internal combustion engine, and more particularly to sparkless ignition of a main charge by way of combustion gases of a pilot charge compression-ignited in a prechamber.

BACKGROUND

Combustion engines, including spark-ignited engines, compression-ignition engines, and still others operate by producing a controlled combustion reaction within a cylinder to drive a piston coupled with a crankshaft. Engineers have experimented with a wide variety of different fuel types, engine configurations, combustion recipes, and ignition strategies for well over a century. Concerns over emissions, costs, and supply, amongst other concerns relating to traditional fuels such as petroleum distillate fuels, have led to increased interest and exploitation of certain gaseous fuels in recent years, including natural gas, landfill gas, biogas, propane, hydrogen, and various blends of these. Known combustion ignition strategies for gaseous fuels relying upon a sparkplug or compression ignition can fail to properly ignite or misfire, produce engine knock or other problems, or may require equipment or operating techniques that are not cost-effective or are otherwise undesired. Spark plugs typically require replacement or at least servicing relatively frequently Prechamber ignition techniques employ a device coupled with the engine that ignites a fuel-and-air mixture in a prechamber separate from the main combustion chamber, thenceforth delivering a jet of hot, combusting gases to the main combustion chamber to produce a more uniform, higher temperature, and robust combustion reaction as compared to traditional strategies. In one typical prechamber design an ignition charge of fuel and air is urged into the prechamber by way of movement of the engine piston in a compression stroke, and thereafter spark-ignited. In another prechamber strategy a separate supply of fuel, the same fuel that is combusted in the main combustion chamber or a different fuel, is provided for the prechamber ignition system. One example prechamber device is known from United States Patent Application Publication No. 2020/00116074 to Chang.

SUMMARY OF THE INVENTION

In one aspect, a method of operating an internal combustion engine system includes advancing a prechamber piston in a fuel delivery igniter to push a main charge of fuel from a prechamber in the fuel delivery igniter into a cylinder in an internal combustion engine. The method further includes advancing the prechamber piston in the fuel delivery igniter to compression-ignite a pilot charge of the fuel within the prechamber, and conveying combustion gases of the compression-ignited pilot charge of the fuel from the prechamber into the cylinder. The method further includes igniting the main charge of fuel in the cylinder by way of the combustion gases of the compression-ignited pilot charge, and urging a main piston in the internal combustion engine toward a bottom-dead-center (BDC) position in a power stroke based on combustion of the main charge of fuel ignited by way of the combustion gases of the compression-ignited pilot charge.

In another aspect, a fuel system for a gaseous fuel engine includes a gaseous fuel conduit, and a fuel delivery igniter including a housing having formed therein each of a prechamber, a fuel inlet to the prechamber fluidly connected to the gaseous fuel conduit, and a nozzle outlet from the prechamber. The fuel delivery igniter further includes a prechamber piston movable in the prechamber between a retracted position and an advanced position. The fuel system further includes a fueling and ignition control system having an electronically controlled actuator structured to advance the prechamber piston through the prechamber, and an electronic control unit coupled with the electronically controlled actuator. The electronic control unit is structured to monitor an engine timing of a gaseous fuel engine in an engine cycle. The electronic control unit is further structured to command advancing the prechamber piston, using the electronically controlled actuator, according to an earlier engine timing in the engine cycle such that the prechamber piston pushes a main charge of gaseous fuel from the prechamber through the nozzle outlet. The electronic control unit is further structured to command advancing the prechamber piston, using the electronically controlled actuator, according to a later engine timing in the engine cycle such that the prechamber piston compression-ignites a pilot charge of the gaseous fuel within the prechamber.

In still another aspect, a method for sparkless operation of a gaseous fuel internal combustion engine system includes feeding a gaseous fuel from a gaseous fuel supply into a prechamber in a fuel delivery ignitor, and pushing unignited gaseous fuel from the prechamber into a cylinder in a gaseous fuel engine using a prechamber piston during an intake stroke of a main piston in the cylinder. The method further includes mixing the unignited gaseous fuel with air in the cylinder, and compression-igniting gaseous fuel in the prechamber using the prechamber piston. The method still further includes conveying combustion gases of the compression-ignited gaseous fuel into the mixture of unignited gaseous fuel and air, and igniting the mixture of unignited gaseous fuel and air by way of the combustion gases of the compression-ignited gaseous fuel.

BRIEF DESCRIPTION OF THE DRAWINGS

FIG. 2 is a graph of engine system events during operation of an internal combustion engine system, according to one embodiment; and FIG. 3 is a flowchart illustrating example methodology and control logic flow, according to one embodiment.

DETAILED DESCRIPTION

Figure 1:
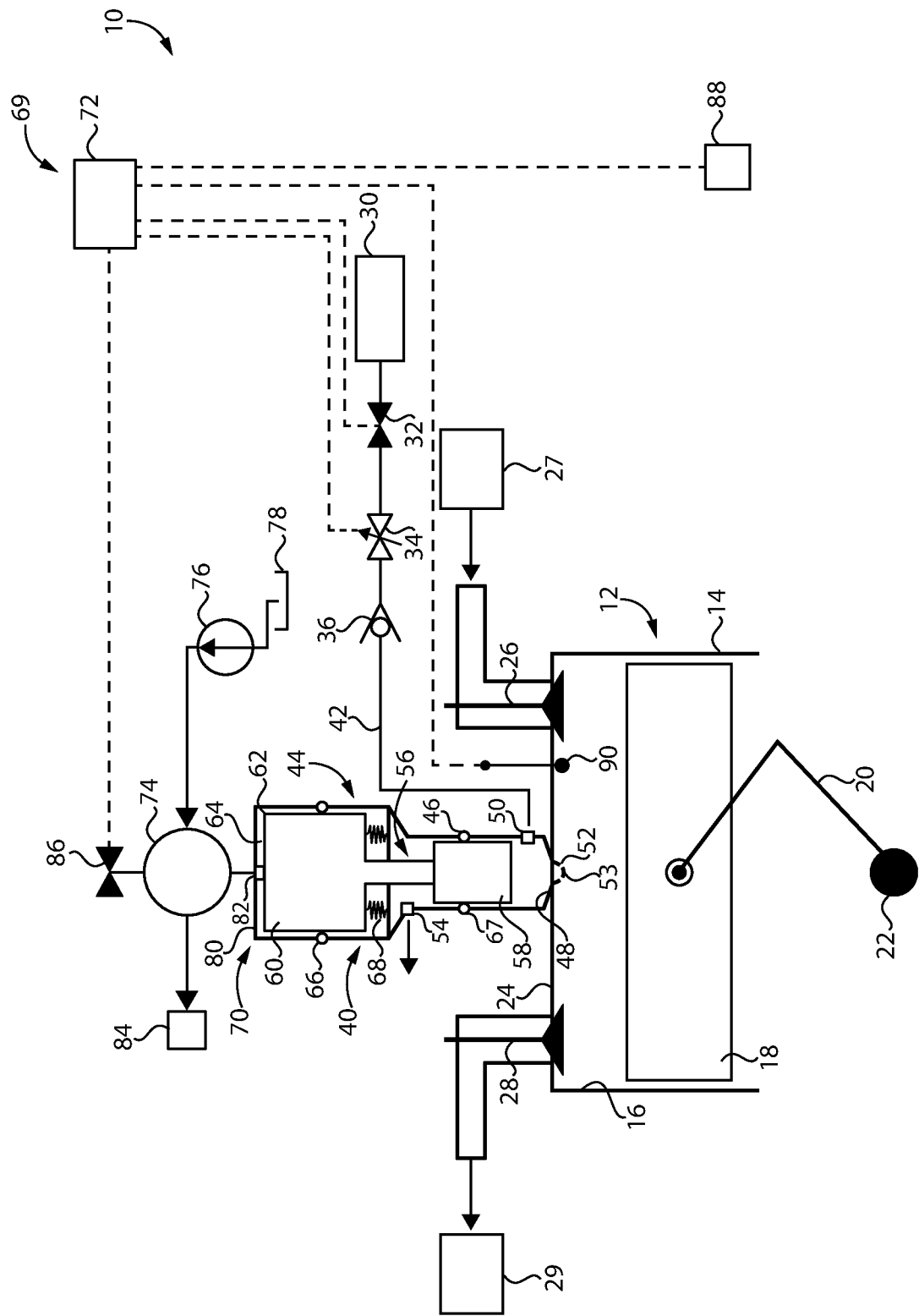
FIG. 1 is a diagrammatic view of an internal combustion engine system, according to one embodiment.

Referring to FIG. 1, there is shown a gaseous fuel internal combustion engine system 10 (hereinafter "engine system 10"). Engine system 10 includes a gaseous fuel internal combustion engine 12 having an engine housing or cylinder block 14 with a combustion cylinder 16 formed therein. A main piston 18 is positioned at least partially within combustion cylinder 16 and movable between a top-dead-center (TDC) position and a bottom-dead-center (BDC) position in a conventional four-stroke engine cycle. Combustion cylinder 16 may be one of a plurality of combustion cylinders formed in cylinder block 14 and in any suitable arrangement, such as a V-pattern, an inline pattern, or still another. Discussion and description herein of combustion cylinder 16 and associated components can be understood to refer by way of analogy to any of the other combustion cylinders and associated components that might be part of internal combustion engine 12. Piston 18 is coupled to a crankshaft 22 by way of a connecting rod 20 in a generally conventional manner. An engine head 24 is attached to cylinder block 14 and has positioned therein an intake valve 26 and an exhaust valve 28. Intake valve 26 might be one of two intake valves and exhaust valve 28 might be one of two exhaust valves.

Intake valve 26 is movable between an open position and a closed position to fluidly connect combustion cylinder 16 with an air intake system 27. Intake system 27 may include any suitable arrangement or combination of air filters, compressors, aftercoolers, intake runners, an intake manifold, and other apparatus that will be familiar to those skilled in the art. Exhaust valve 28 is movable between an open position and a closed position to fluidly connect combustion cylinder 16 with an exhaust system 29. Exhaust system 29 can include a tailpipe or exhaust stack and may or may not include aftertreatment elements known to those skilled in the art. As will be further apparent from the following description engine system 10 may operate to produce very low or substantially zero amounts of certain emissions, and exhaust aftertreatment may not be necessary at all. Engine system 10 may, moreover, include no sparkplugs and operate by sparkless ignition, as further discussed herein.

Engine system 10 further includes a fuel system 40 having a gaseous fuel conduit 42 extending between a fuel supply 30 and a fuel delivery igniter 44. In a practical implementation, fuel supply 30 provides a gaseous fuel to fuel delivery igniter for forming a larger main charge of gaseous fuel, and for forming a smaller pilot charge of the gaseous fuel, in fuel delivery igniter. Fuel supply 30 can include one or both of a gaseous fuel storage tank and a hydrogen reformer. The gaseous fuel may thus include gaseous molecular hydrogen fuel. A fuel pressure regulator 34 may be positioned fluidly between gaseous fuel supply 30 and gaseous fuel conduit 42. A gaseous fuel admission valve 32 may be positioned fluidly between gaseous fuel supply 30 and fuel pressure regulator 34. A check valve 36 may be positioned fluidly between fuel pressure regulator 34 and gaseous fuel conduit 42. Other gaseous fuel conduits may connect between and among various components of fuel system 40.

Fuel delivery igniter 44 is structured to supply a main charge of unignited gaseous fuel into combustion cylinder 16, and also structured to compression-ignite a pilot charge of the gaseous fuel, and convey combustion gases of the compression-ignited gaseous fuel into combustion cylinder 16, for ignition of the unignited gaseous fuel of the main charge mixed with air, as further discussed herein. Fuel delivery igniter 44 includes a housing 46 having formed therein each of a prechamber 48, a fuel inlet to prechamber 48 fluidly connected to gaseous fuel conduit 42, and a nozzle outlet 52 from prechamber 48. Nozzle outlet 52 is continuously fluidly connected to cylinder 16. Housing 46 could include a single housing part or piece or multiple housing parts or pieces, connected or unconnected, at least one of which will typically be mounted in engine head 24 and positioned such that a tapered tip 53 of housing 46 extends into combustion cylinder 16. Nozzle outlet 52 may be one of a plurality of nozzle outlets distributed around tip 53 and oriented to direct hot combustion gases of a compression-ignited pilot charge downwardly toward piston 18 and generally outwardly in combustion cylinder 16 to ignite the main charge of unignited gaseous fuel.

Fuel delivery igniter 44 further includes a prechamber piston 56 movable in prechamber 48 between a retracted position and an advanced position. In an implementation, all of a main charge of fuel and a pilot charge of fuel may be supplied into prechamber 48 through fuel inlet 50. This means that engine 12 may in at least some embodiments be fueled entirely through fuel delivery igniter 44. Prechamber piston 56 may be formed by one or more piston pieces, and in the illustrated embodiment includes an actuation piston or fueling piston 58 coupled to a hydraulic piston 60. Hydraulic piston 60 includes a piston head 62 having a hydraulic actuation surface formed thereon. Hydraulic actuation surface 64 may be exposed to a fluid pressure of a hydraulic control chamber 80, formed in housing 46, for example. A first seal 66, such as a conventional O-ring seal, extends circumferentially around hydraulic piston 60 and fluidly seals between hydraulic piston 60 and housing 46. A second seal 67, such as another conventional O-ring seal, extends circumferentially around fueling piston 58 and fluidly seals between fueling piston 58 and housing 46. A gas leak return outlet 54 is formed in housing 46, in the illustrated embodiment between fueling piston 58 and hydraulic piston 60, and is structured to convey leaked gas from fuel delivery igniter 44 back to fuel supply 30, for example, or elsewhere in engine system 10 for recapture or burning. A return spring 68 is trapped between hydraulic piston 60 and housing 46. Return spring 68 could include multiple return springs and could be positioned operably between fueling piston 58 and housing 46, or operably between hydraulic piston 60 and housing 46, for instance.

Fuel system 40 further includes a fueling and ignition control system 69 including an electronically controlled actuator 70 structured to advance prechamber piston 56 through prechamber 48. In an implementation, electronically controlled actuator 70 includes piston head 62, and a chamber pressure control valve 86. Hydraulic control chamber 80 may be fluidly connected to a hydraulic circuit 74 such as by way of a hydraulic inlet/outlet 82 formed in housing 46. A hydraulic pump 76 conveys hydraulic fluid from a tank 78 to hydraulic circuit 74. Hydraulic circuit 74 includes a drain 84, such as a drain back to hydraulic tank 78. Chamber pressure control valve 86 may be movable between an open position, where hydraulic control chamber 80 is fluidly connected to drain 84, and a closed position, where chamber pressure control valve 86 blocks hydraulic control chamber 80 from drain 84. By selectively closing and opening chamber pressure control valve 86, hydraulic pressure in hydraulic control chamber 80, and hydraulic flow into and out of hydraulic control chamber 80, is manipulated to advance prechamber piston 56 from its retracted position toward its advanced position. Controlling chamber pressure control valve 86 also enables prechamber piston 56 to be stopped or reversed from advancing, as further discussed herein. Return spring 68 biases prechamber piston 56 toward its retracted position, such that advancing prechamber piston 56 occurs in opposition to a bias of return spring 68.

Fueling and ignition control system 69 further includes an electronic control unit 72 coupled with electronically controlled actuator 70. Electronic control unit 72 can include a microprocessor, a microcontroller, or any other suitable computerized device having a central processing unit and a computer readable memory. Electronic control unit 72 may also be in communication with chamber pressure control valve 86, with pressure regulator 34, with fuel admission valve 32, and with a pressure sensor 90 exposed to a fluid pressure of combustion cylinder 16. Based upon a monitoring of fluid pressure in combustion cylinder 16 electronic control unit 72 can monitor a phasing of combustion within combustion cylinder 16, detect aggressive combustion or knock, and potentially also balance fluid pressures amongst multiple different cylinders in engine system 10, such as by varying fueling amounts and/or fuel delivery pressures and various other factors.

Fueling and ignition control system 69 may also include an engine timing sensor 88 coupled with electronic control unit 72 so as to enable electronic control unit 72 to monitor an engine timing of engine 12 during operation. The monitored engine timing can include a crank angle timing, and engine timing sensor 88 could be a conventional flywheel timing sensor coupled to a flywheel of internal combustion engine 12. Electronic control unit 72 may thus be structured to monitor an engine timing of an internal combustion engine, including a gaseous fuel engine as in the embodiment of FIG. 1, in an engine cycle. Electronic control unit 72 may be further structured to command advancing prechamber piston 56, using electronically controlled actuator 70, according to an earlier engine timing in the engine cycle, such that prechamber piston 56 pushes a main charge of gaseous fuel from prechamber 48 through nozzle outlet 52. Electronic control unit 72 may be further structured to command advancing prechamber piston 56, using electronically controlled actuator 70, according to a later engine timing in the engine cycle such that prechamber piston 56 compression-ignites a pilot charge of the gaseous fuel within prechamber 48. The terms "according to" an earlier engine timing and "according to" a later engine timing may each mean a starting timing, such as a crank angle location, for the commanded advancement of prechamber piston 56. According to an earlier engine timing or according to a later engine timing could also mean a timing of completing the advancement of prechamber piston 56, such as a crank angle location, or a timing of closing or opening chamber pressure control valve 86. In some instances chamber pressure control valve 86 might be closed and opened numerous times to move prechamber piston 56 at a slower speed, to move prechamber piston 56 at a faster speed, to stop travel of prechamber piston 56, or to reverse travel of prechamber piston 56.

In an implementation, the earlier engine timing occurs during an intake stroke of piston 18, and the later engine timing occurs during a compression stroke of piston 18. Further, advancing of prechamber piston 56 according to the earlier engine timing may occur at a slower prechamber piston speed, pushing unignited gaseous fuel of the main charge from prechamber 48 without causing compression-ignition. The advancing of prechamber piston 56 according to the later engine timing can occur at a faster prechamber piston speed, causing compression-ignition of the gaseous fuel in prechamber 48. The compression-ignited gaseous fuel of the pilot charge produces combustion gases that are conveyed into combustion cylinder 16 to ignite the main charge rapidly and reliably, as discussed herein. As also indicated above, electronic control unit 72 may be further structured to command stopping or reversing (retracting) of prechamber piston 56 after the pushing of the main charge of gaseous fuel and prior to the compression-igniting of the pilot charge of gaseous fuel.

Referring now also to FIG. 2, there is shown a graph 100 of engine events that might be observed during operation of engine system 10. In FIG. 2, the Y-axis indicates crank angle and the left X-axis indicates distance, such as approximate valve lift distance and approximate prechamber piston lift distance. The right X-axis indicates fuel mass flow. In FIG. 2, a line 105 shows example exhaust valve lift, reaching a maximum lift at an open position at about −475° crank angle location before a TDC main piston position at 0° crank angle. A line 110 shows intake valve lift during an intake stroke. A line 115 indicates prechamber piston position. A line 120 shows a main charge of gaseous fuel mass flow, and a line 122 shows a pilot charge of gaseous fuel mass flow.

Initially, in the example illustration, the prechamber piston 56 is at its retracted position, but just prior to −300° crank angle begins to advance. A portion of line 115 indicated with numeral 125 shows the initial, slower speed advancement of prechamber piston 56 according to the earlier engine timing and at least in part during an intake stroke of main piston 18 where intake valve 26 is open. Shortly before intake valve 26 is closed, at about −150° crank angle, prechamber piston 56 reaches its advanced position, having pushed the main charge of gaseous fuel from prechamber 48 in fuel delivery igniter 44 into cylinder 16.

At about the time that intake valve 26 is fully closed, prechamber piston 56 is rapidly retracted, as shown by way of numeral 130 in FIG. 2. After returning to its retracted position, prechamber piston 56 may be stopped or idled briefly, as shown by way of numeral 135. While prechamber piston 56 is retracting or while stopped at its retracted position, gaseous fuel of pilot charge 122 may be conveyed into prechamber 48. Shortly before 0° crank angle or a TDC position of main piston 18, prechamber piston 56 is again advanced, according to the later engine timing and at least in part during a compression stroke of main piston 18, and at a faster speed, as shown by way of numeral 140, to compression-ignite the gaseous fuel in prechamber 48. Combustion gases of the compression-ignited pilot charge may be conveyed from prechamber 48 into cylinder 16, as discussed herein. Igniting the main charge of fuel in cylinder 16 by way of the combustion gases of the compression-ignited pilot charge, urges main piston 18 toward its BDC position in a power stroke.

It should be appreciated that various alterations and modifications of the events depicted in graph 100 might be made within the scope of the present disclosure. For example, embodiments are contemplated where prechamber piston 56 is advanced a first distance to push the main charge into cylinder 16, and then without retracting is advanced more rapidly an additional distance to compression-ignite the pilot charge. In such an arrangement all of the gaseous fuel that is to provide the main charge and the pilot charge may be resident in prechamber 48 prior to commencing moving of prechamber piston 56. In other instances, prechamber piston 56 might not be advanced all the way to its advanced position to push the main charge into cylinder 16, but advanced all the way to its advanced position to compression-ignite the pilot charge. Other variations might include feeding gaseous fuel into prechamber 48 in stages, at different pressures, continuously, or still others.

INDUSTRIAL APPLICABILITY

Referring also now to FIG. 3, there is shown example methodology and logic flow according to one embodiment, in a flowchart 200. Flowchart 200 includes a block 210 where fuel is fed into prechamber 48. Fuel can be fed into prechamber 48 in response to prechamber piston 56 retracting, by employing supply pressure, or by combinations of supply pressure and prechamber piston motion. From block 210 flowchart 200 advances to a block 220 to monitor engine timing. Monitoring engine timing may be achieved by electronic control unit 72 receiving periodic or continuous engine speed signals from sensor 88. From block 220 flowchart 200 advances to a block 230 to command moving chamber pressure control valve 86 to again advance prechamber piston 56, and then to a block 240 to push the main charge of fuel including unignited gaseous fuel from prechamber 48 into cylinder 16 using prechamber piston 56.

As discussed herein the pushing of unignited gaseous fuel can occur during an intake stroke of main piston 16. The unignited gaseous fuel will then commence mixing with air in cylinder 16. Flowchart 200 may then advance to a block 250 to command moving chamber pressure control valve 86 to retract or reverse, or potentially to stop, prechamber piston 56. Flowchart 200 may then advance to a block 260 to command moving chamber pressure control valve 86 to advance prechamber piston 56, and then to a block 270 to compression-ignite the pilot charge of fuel in prechamber 48. From block 270, flowchart 200 may advance to block 280 to ignite the main charge of fuel by way of combustion gases of the pilot charge conveyed into cylinder 16.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an internal combustion engine system comprising:
   advancing a prechamber piston in a fuel delivery igniter to push a main charge of fuel from a prechamber in the fuel delivery igniter into a cylinder in an internal combustion engine;
   advancing the prechamber piston in the fuel delivery igniter to compression-ignite a pilot charge of the fuel within the prechamber;
   conveying combustion gases of the compression-ignited pilot charge of the fuel from the prechamber into the cylinder;
   igniting the main charge of fuel in the cylinder by way of the combustion gases of the compression-ignited pilot charge; and
   urging a main piston in the internal combustion engine toward a bottom-dead-center (BDC) position in a power stroke based on combustion of the main charge of fuel ignited by way of the combustion gases of the compression-ignited pilot charge.

2. The method of claim 1 wherein the fuel is a gaseous fuel.

3. The method of claim 2 wherein the gaseous fuel includes hydrogen.

4. The method of claim 2 further comprising supplying all of the main charge of fuel and the pilot charge of fuel into the prechamber through a fuel inlet in the fuel delivery igniter separate from a nozzle outlet in the fuel delivery igniter.

5. The method of claim 4 further comprising stopping or reversing the prechamber piston between the pushing of the main charge of fuel and the compression-igniting of the pilot charge of fuel.

6. The method of claim 2 wherein:
   the advancing of the prechamber piston to push a main charge occurs at least in part during an intake stroke of the main piston; and
   the advancing of the prechamber piston to compression-ignite a pilot charge occurs at least in part during a compression stroke of the main piston.

7. The method of claim 6 wherein:
   the advancing of the prechamber piston to push a main charge includes advancing the prechamber piston at a slower speed; and
   the advancing of the prechamber piston to compression-ignite a pilot charge includes advancing the prechamber piston at a faster speed.

8. The method of claim 2 wherein the prechamber piston is hydraulically actuated, and further comprising blocking a hydraulic actuation chamber for the prechamber piston from a drain to initiate the advancing of the prechamber piston to push a main charge, and to initiate the advancing of the prechamber piston to compression-ignite a pilot charge.

9. A fuel system for a gaseous fuel engine comprising:
   a gaseous fuel conduit;
   a fuel delivery igniter including a housing having formed therein each of a prechamber, a fuel inlet to the prechamber fluidly connected to the gaseous fuel conduit, and a nozzle outlet from the prechamber, and further including a prechamber piston movable in the prechamber between a retracted position and an advanced position;
   a fueling and ignition control system including an electronically controlled actuator structured to advance the prechamber piston through the prechamber, and an electronic control unit coupled with the electronically controlled actuator;
   the electronic control unit is structured to:
      monitor an engine timing of a gaseous fuel engine in an engine cycle;
      command advancing the prechamber piston, using the electronically controlled actuator, according to an earlier engine timing in the engine cycle such that the prechamber piston pushes a main charge of gaseous fuel from the prechamber through the nozzle outlet; and
      command advancing the prechamber piston, using the electronically controlled actuator, according to a later engine timing in the engine cycle such that the prechamber piston compression-ignites a pilot charge of the gaseous fuel within the prechamber.

10. The fuel system of claim 9 wherein the earlier engine timing occurs during an intake stroke of a main piston in the gaseous fuel engine, and the later engine timing occurs during a compression stroke of the main piston.

11. The fuel system of claim 10 wherein the advancing of the prechamber piston according to the earlier engine timing occurs at a slower prechamber piston speed, and the advancing of the prechamber piston according to the later engine timing occurs at a faster prechamber piston speed.

12. The fuel system of claim 11 wherein the electronic control unit is further structured to command stopping or reversing of the prechamber piston after the pushing of the main charge of gaseous fuel and prior to the compression-igniting of the pilot charge of gaseous fuel.

13. The fuel system of claim 9 wherein the housing has a hydraulic control chamber formed therein, and the electronically controlled actuator includes a piston head of the prechamber piston exposed to a fluid pressure of the hydraulic control chamber, and a chamber pressure control valve.

14. The fuel system of claim 13 further comprising a gaseous fuel supply, a fuel pressure regulator positioned fluidly between the gaseous fuel supply and the gaseous fuel conduit, and a gaseous fuel admission valve positioned fluidly between the gaseous fuel supply and the fuel pressure regulator.

15. The fuel system of claim 14 wherein the gaseous fuel includes hydrogen and the gaseous fuel supply includes at least one of a hydrogen tank or a reformer.

16. A method for sparkless operation of a gaseous fuel internal combustion engine system comprising:

feeding a gaseous fuel from a gaseous fuel supply into a prechamber in a fuel delivery igniter;

pushing unignited gaseous fuel from the prechamber into a cylinder in a gaseous fuel engine using a prechamber piston during an intake stroke of a main piston in the cylinder;

mixing the unignited gaseous fuel with air in the cylinder;

compression-igniting gaseous fuel in the prechamber using the prechamber piston;

conveying combustion gases of the compression-ignited gaseous fuel into the mixture of unignited gaseous fuel and air; and igniting the mixture of unignited gaseous fuel and air by way of the combustion gases of the compression-ignited gaseous fuel.

17. The method of claim 16 further comprising hydraulically actuating the prechamber piston to push the unignited gaseous fuel into the cylinder, and hydraulically actuating the prechamber piston to compression-ignite the gaseous fuel in the prechamber.

18. The method of claim 17 further comprising moving the prechamber piston at a slower speed to push the unignited gaseous fuel into the cylinder, and moving the prechamber piston at a faster speed to compression-ignite the gaseous fuel in the prechamber.

19. The method of claim 18 further comprising stopping or reversing the prechamber piston between the pushing of the unignited gaseous fuel and the compression-igniting of the gaseous fuel.

20. The method of claim 18 wherein the gaseous fuel includes hydrogen.

* * * * *